Aug. 22, 1961 TOMOMI MURAKAMI ET AL 2,997,579
TUNABLE OSCILLATOR CIRCUIT
Filed May 27, 1953
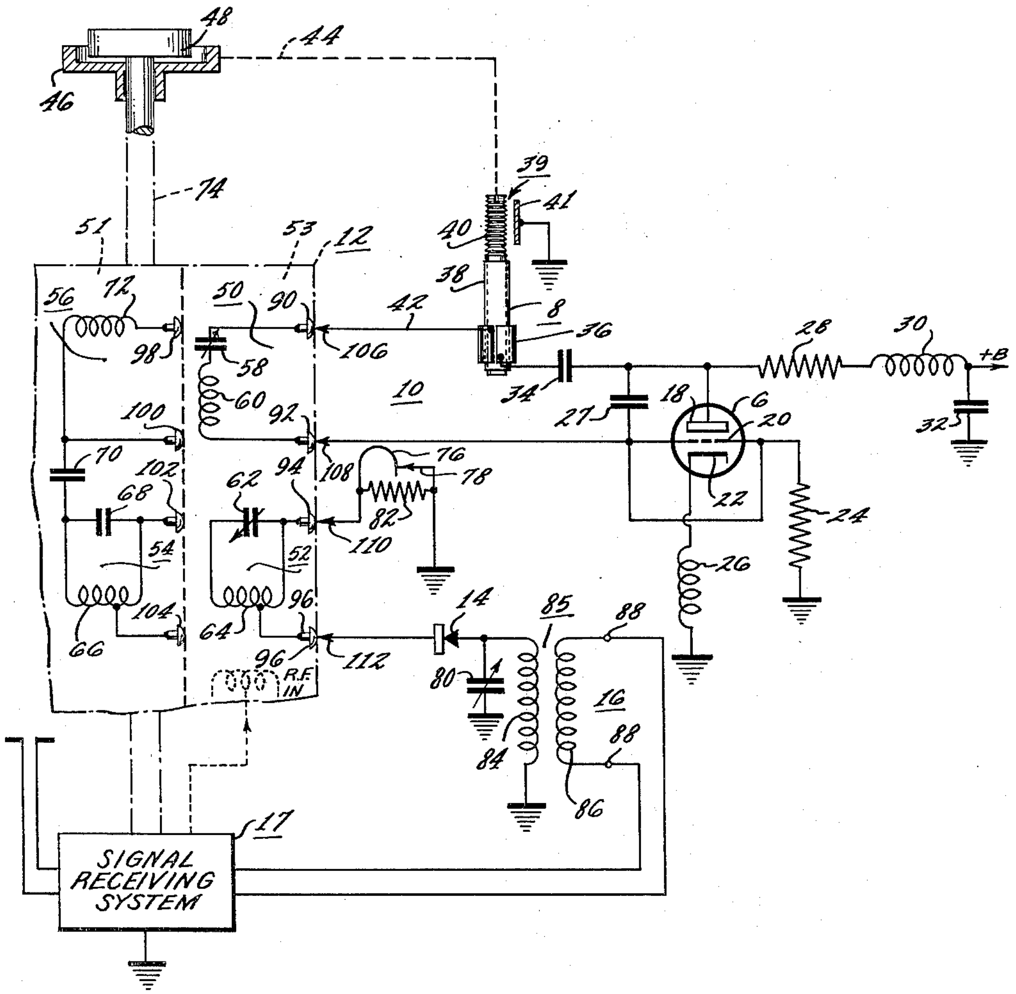
INVENTORS
Tomomi Murakami
& John C. Achenbach
BY H. D. Newton
ATTORNEY

1

2,997,579

TUNABLE OSCILLATOR CIRCUIT

Tomomi Murakami and John C. Achenbach, Haddonfield, N.J., assignors to Radio Corporation of America, a corporation of Delaware Filed May 27, 1953, Ser. No. 357,688
1 Claim. (Cl. 250—20)

This invention relates in general to improved oscillator circuits for signal receiving systems and the like, and in particular to improved resonant circuits suitable for use as the frequency determining circuits of the oscillators of television receiving systems which are operative over a wide range of relatively high radio frequencies.

Initially two very high frequency (V.H.F.) bands were allocated for the transmission and reception of television signals. These bands presently extend from 54 to 88 megacycles (mc.) and from 174 to 216 megacycles (mc.), accommodating television channels 2 to 6 and 7 to 13 respectively. Recently an ultra-high frequency (U.H.F.) band of frequencies has been allocated for the transmission and reception of television signals, in addition to the two V.H.F. bands already in existence. This band extends from 470 to 890 mc. and accommodates 70 more channels, that is, channels 14 to 83 inclusive. This extension of the allocated television frequency bands will make available one or more U.H.F. channels in addition to the presently existing V.H.F. channels in many areas. In other areas it will permit television signal reception for the first time. While this extension of commercially available television signal channels has many advantages, these advantages have not been realized without overcoming certain technical problems and difficulties.

Among these problems is included that of designing a local oscillator circuit capable of producing oscillations over a very wide range of frequencies, thus permitting a single oscillator for both V.H.F. and U.H.F. reception. At present, the recommended intermediate frequency of superheterodyne television receiving systems is 41.25 mc. for the sound carrier and 45.75 mc. for the picture carrier. Accordingly, in the lower V.H.F. band of frequencies a local oscillator frequency varying between approximately 100 mc. and 130 mc. is needed, while in the upper V.H.F. band the local oscillator must oscillate at frequencies between approximately 220 and 260 mc. In the U.H.F. band of frequencies the fundamental oscillator frequency must be variable between at least 517 and 931 mc. Thus a single oscillator capable of producing oscillations in the frequency range extending between 100 and 940 mc. would presently be preferred for combined V.H.F. and U.H.F. television signal reception. In other types of wide range high frequency signal receiving systems the same problem is present.

Accordingly, it is an object of this invention to provide an improved local oscillator for signal receiving systems and the like which may be tunable over a wide range of radio frequencies while maintaining substantially uniform signal transfer and stable operation.

It is a further object of the present invention to provide an improved local oscillator for a television signal receiving system operative effectively within both the V.H.F. and U.H.F. bands of signal frequencies for which the system is designed.

Among tuning devices proposed for combined V.H.F. and U.H.F. signal reception is the turret type tuner. A turret type tuner may comprise in general a series of rotatably selectable insulating segments, each carrying circuit elements for use in a particular signal frequency channel. The segments are affixed to a drum type turret tuning structure which is rotatable by means of a tuning or band change control shaft. Circuit elements,

2 including tuning inductors and capacitors, are affixed to one surface of each of the segments which are in the form of planar insulating strips or forms. The circuit elements may be printed or photo-engraved on the surface of the segments or they may comprise individual inductance coils and capacitors which are physically mounted on the surface of the segments.

The television viewer, by rotating the tuning shaft of a turret tuner places the tuning elements of the selected segment corresponding to one of the channels, in circuit with various predetermined stages of the receiver circuit. It is in this manner that the frequency responsive characteristic of the receiver may selectively be changed in accordance with the particular channel which the viewer desires.

If a turret-type tuner is used for combined V.H.F. and U.H.F. reception, it would be desirable if the fundamental frequency of the local oscillator could be changed by providing a resonant circuit structure into which tuning elements of varying impedance values could be switched to vary the fundamental oscillator frequency. It is also desirable in such a system that fine or vernier tuning to each selected frequency or channel be accomplished, over the entire range of frequencies, using a single control and tuning element.

Accordingly, it is a still further object of the present invention to provide an improved resonant circuit for a local oscillator which may be used with a turret-type tuner and which will tune the oscillator over a wide range of frequencies.

It is yet another object of the present invention to provide an improved local oscillator circuit which is operative over a wide range of frequencies and which has a single fine tuning means.

These and further objects of the present invention are achieved by providing a single local oscillator for both V.H.F. and U.H.F. signal reception. Tuning of the oscillator within each band of frequencies is accomplished by switching tuning elements having varying impedance values into the plate and grid circuits of the oscillator. A single variable impedance element in the plate and grid circuit of the oscillator provides fine or vernier tuning of the oscillator over the entire range of operating frequencies.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

The single figure is a schematic circuit diagram of a local oscillator of a signal receiving system and its associated tuning means arranged and connected in accordance with the invention.

Referring to the drawing, the oscillator circuit may comprise generally an electron tube 6, a fine tuning unit 8, a tunable tank circuit 10, a tuning or signal band selecting means 12, a signal mixer device 14, and a signal output circuit 16. In its use with a television receiving system 17, for example, the output circuit is connected with the system as is also the tuning means 12, as indicated.

The electron tube 6 has an anode 18, a cathode 22, and a control electrode or grid 20. To provide proper grid bias voltage, a grid resistor 24 is connected between the grid 20 and chassis or ground for the system, as indicated. The cathode 22 is connected to ground through a radio-frequency choke coil 26. The coil 26 is designed to have a high impedance over the U.H.F. range of oscillator frequencies. For temperature compensation purposes, a low capacitance negative temperature coefficient capacitor 27 is connected from one side of the anode 18 to a point intermediate the grid 20 and the resistor 24. The operating current supply connection for the anode includes a series damping resistor 28 and a series inductor 30 connected between the anode and a source of anode potential indicated at +B. A filter capacitor 32 is connected at the supply end of the inductor 30 to ground. The capacitor 32 to ground by-passes unwanted radio frequency signals.

The anode 18 is also connected through a coupling or blocking capacitor 34 to one end of a member 36 of the fine tuning unit 8. The member 36 is in the form of a split cylinder of conducting material and is substantially equivalent to a one-turn inductance coil. Mounted inside the cylinder 36 is a short length of thin-wall insulating tubing 38 which serves as a coil form and as an insulating element between the cylinder 36 and a conductive tuning core 40 which is the other member of the fine tuning unit 8. The core is mounted so that it will slide inside the form 38 and relative to the outer element or member 36.

A fine tuning control knob 46 for the oscillator is connected through suitable means indicated by the dotted line 44 to the core 40 in such a manner as to permit movement of the core 40 inside the core form 38 and relative to the cylinder 36, between a position within to a position without the cylinder. When used with a television receiving system, for example, by turning the control knob 46 the viewer is able to adjust the position of the core 40 inside the form 38 and the tuning of the system to a precise frequency response. With the system shown, fine tuning may be accomplished over a wide range of operating frequencies, as will hereinafter be explained.

The main oscillator tuning means 12 may be a so-called turret tuner of the type described in a copending application by T. Murakami and J. Achenbach, Serial No. 357,687 filed on May 27, 1953, now Patent No. 2,789,227, and assigned to the same assignee as this application. The tuner 12 comprises a control shaft 74 which extends in a longitudinal direction along the length of the tuner and in the present example, into the receiving system, for joint tuning control thereof. The tuner housing may be divided into a series of compartments, by shielding elements (not shown). Mounted between these shielding elements there may be a series of tuning segments or strips, one corresponding to each of the television frequency channels that the tuner is adjusted to select. A portion of two of these tuning strips has been illustrated in schematic circuit form at 51 and 53.

The tuning elements as described in the case above referred to may comprise planar insulating strips upon which tuning elements, such as inductors or capacitors are printed or mounted in any suitable manner. The strips or segments carry contacts 90, 92, 94, 96, 98, 100, 102 and 104 which are connected to the tuning elements thereon. By turning a tuning knob 48 connected with the shaft 74, the contacts on the tuning segments are brought into selective engagement with fixed contacts 106, 108, 110, and 112 of the external circuit.

In the present example, each of the tuning segments 51, 53 is shown as comprising the elements of two tuned circuits, those on the segment 53 being circuits 50 and 52, while the tuned circuits 54 and 56 are those of the segment 51. These may be the oscillator and mixer circuits of a signal receiving system.

It should be understood that the two segments illustrated are by way of example only, and in actual practice a plurality of such segments would be mounted around the periphery of the turret. Thus, if the tuner has sixteen positions, sixteen of such segments would be used and sixteen television frequency channels could be accommodated. It should also be understood that the segments 51 and 53 may contain more tuned circuits than the two illustrated for each segment and in actual practice will contain more.

The tuned circuits 50 and 56 which are mounted on the tuning segments 53 and 51 respectively are used as the frequency determining circuits for the oscillator. Thus, for example, in the turret position illustrated, the contacts 90 and 92 of the tuned circuit 50 are engaged with the fixed contacts 106 and 108 respectively of the oscillator circuit. Thus, a variable capacitor 58 and a small inductor 60 which comprise the tuned circuit 50 will be placed in circuit between the plate 18 and the grid 20 of the oscillator tube 6. If the turret is rotated so that the contacts 98 and 100 of the tuned circuit 56 are engaged with the fixed contacts 106, 108 respectively, an inductor 72 will be placed in circuit between the plate 18 and the grid 20 of the electron tube 6. In this manner tuning adjustment of the oscillator through various frequency bands or channels is accomplished. Since the electrical impedance of the tuning elements which are switched into the plate and grid circuits can be made for any desired value, the oscillator may be tuned over an extensive range of frequencies. Tests have indicated that a tuning range extending from 100 to 970 mc. is possible with the arrangement illustrated.

Affixed to the segments 51 and 53 respectively are additional tuned circuits 54 and 52 which are the frequency determining units for the mixer circuit. The mixer 14 is shown as being of the two electrode crystal type, although other types may be used. A silicon crystal diode of the 1N82 type is preferred however, this type having a satisfactory signal to noise ratio over the entire range of operating frequencies.

In the turret position illustrated, the contacts 94 and 96 of the tuned circuit 52 are engaged with the fixed contacts 110 and 112 respectively of the mixer circuit. Thus, a variable capacitor 62 and a portion of an inductor 64 are switched into the mixer circuit. If the turret is rotated so that the contacts 102 and 104 of the tuned circuit 54 may engage the fixed contacts 110 and 112, respectively, a variable capacitor 68 and a portion of an inductor 66 will be switched into the mixer circuit. Accordingly, the mixer circuit will be tuned between the various frequency channels at the same time that the oscillator circuit is tuned. Signal input is from the system as indicated.

Injection of oscillatory energy to the mixer 14 is accomplished in either of two different ways, depending on the particular frequency of the signal which is being received. At the lower frequencies in the V.H.F. band such as the band from 54 to 88 mc. for example, the coupling may be capacitive, while at the higher frequencies in the V.H.F. band and in the U.H.F. the coupling may be inductive.

The tuning segment 53 illustrates a typical arrangement of tuning elements that might be used for the U.H.F. channels. In the turret position illustrated, coupling of oscillator energy from the tank circuit 10 to the signal mixer 14 is inductive. To this end a substantially half-turn inductive loop 76 is connected to the fixed contact 110 in the mixer circuit and in close proximity to the tank circuit 10 of the oscillator. Because of the proximity of the inductor 76 to the tank circuit, mutual inductive coupling will be present between the tank circuit leads and the inductor 76. The inductor 76 is also connected through a variable tap 78 to ground. To reduce oscillator injection at certain frequencies, and thereby maintain a substantially constant injection, a resistor 82 having a predetermined resistance is connected in shunt with the inductor 76 and the tap 78. To vary the amount of injected oscillator energy the tap 78 may be moved relative to and along the inductor 76.

The tuning segment 51 represents a typical arrangement of tuning elements that may be used for any one of the lower V.H.F. channels, as for example, channels 2 to 6. When the turret is rotated so that the several contacts 98, 100, 102, 104 of the segment 51 are engaged with the fixed contacts 106, 108, 110 and 112 respectively, the receiver will be tuned to one of these lower channels, depending on the exact values of the tuning elements which comprise the segment 51. In this turret position, the coupling of the oscillator energy to the signal mixer 14 is capacative. This capacitive coupling is achieved by connecting a small capacitor 70 between the tuned circuits 56 and 54 of the tuning segment 51. This capacitor may present a low impedance path to oscillator signals in the lower V.H.F. band of frequencies.

One electrode of the signal mixer is connected directly to the fixed contact 112. The other electrode of the mixer is connected directly to the primary winding 84 of an output transformer 85. A capacitor 80 is provided to tune the transformer 85 and to bypass radio frequencies other than the intermediate frequency. Output signals are taken across the secondary winding 86 of the transformer 85. A pair of output terminals 88 are connected to either end of the secondary 86.

It is apparent that the oscillator of the circuit shown is of the well-known ultra-audion type in which feedback is established by the inter-electrode capacitances of the tube. The tank circuit 10 of the oscillator is connected between the plate 18 and the control grid 20 of the electron tube 6. By switching in various amounts of inductance into this tank circuit by means of the tuner 12, the frequency of oscillations can be varied over the required range. Thus, for example, in the tuner position shown, the capacitor 58 and the inductor 60 of the tuned circuit 50 are connected in circuit betwen the plate 18 and the grid 20. In this position, oscillations of a frequency suitable for the heterodyning of signals corresponding to one of the U.H.F. channels will be produced. If the turret is rotated so as to place the inductor 72 of the tuned circuit 56 between the plate 18 and the grid 20, oscillations of a frequency suitable for the heterodyning of signals corresponding to one of the lower V.H.F. channels will be produced. By switching more inductance into the tank circuit 10 the oscillator frequency may be lowered and the oscillator frequency may be varied or adjusted over the required frequency range corresponding to various signal bands or channels, the range being limited only by the available number of tuning segments and the inductance of the tuned circuits on the segments.

As was hereinbefore explained, one of the features of the present invention is the provision of a single fine-tuning element for the entire range of signal channels provided by the turret tuner. Only one control knob is required, therefore, to fine tune the receiving system to any of the signal channels. In this connection, and in accordance with the invention, the fine tuning unit 8 is connected in the tank circuit 10 on the anode side of the oscillator tube 6.

In the tuner 12 position shown (i.e., U.H.F. reception) fine tuning is accomplished by changing the effective inductance between the plate 18 and the grid 20. This inductance is contained in the split cylinder 36 which is effectively a low inductance one-turn coil. The inductance of the cylinder or coil 36 may be varied by moving the conductive core 40 inside the core form 38 and relative to the coil 36. This is accomplished by turning the fine tuning control knob 46 which is connected to the core 40 as described and as indicated. Since the inductance in the plate-to-grid circuit of the oscillator tube is relatively small for U.H.F. reception, any change in the inductance of the coil 36 is relatively great as compared to the total tank circuit inductance.

In the turret position illustrated, the value of the inductor 60 is comparatively small. It has been also observed that for U.H.F. reception, the anode socket connection of the tube 6 will be at or very nearly at a voltage node. Because the tuning element 8 is placed on the anode side of the tank circuit it will be located at or very near a voltage node point. The fine tuning element will therefore be relatively insensitive to capacitance to ground changes. Thus, changes of inductance of the fine tuning element as the core 40 is moved inside the coil 36 will predominate and the tuning of the tank circuit will be due almost entirely to these latter changes. Accordingly, as the core 40 is moved relative to the coil 36, the frequency of oscillations may be effectively changed to the extent necessary for fine tuning of the circuit. For U.H.F. reception, the resonant frequency of the oscillator will be increased as the core 40 is moved into the coil 36, which decreases the total plate to grid inductance.

It has also been determined that the fine tuning element 8 constructed and connected in accordance with the present invention will effectively fine tune the circuit over the entire V.H.F. band of frequencies. As the lower frequency channels are selected, more and more tank circuit inductance is added. Thus, for channel 2, with the oscillator frequency at 101 mc., the plate to grid inductance will be at a maximum. It is therefore apparent that any change in the inductance of the split cylinder or coil 36 due to movement of the core 40, since the inductance of coil 36 is quite small, will be relatively small as compared to the total tank circuit inductance.

It has also been observed that for V.H.F. reception, because of the plate to grid impedance values, the anode 18 of the oscillator tube 6 will be very nearly at a radio frequency voltage maximum point (as opposed to the voltage node position at U.H.F. reception.) Because of these two factors, the change of inductance of the fine tuning element will be ineffective to change the resonant frequency of the oscillator circuit, but the circuit will be quite sensitive to even small capacitance changes. It has also been observed that a certain amount of capacitance exists between the turning unit 8 and ground (which may be the chassis of the receiver). This capacitance which has been indicated schematically by the numeral 39 may be varied by moving the core 40. Accordingly, as the core 40 is lowered into the coil 36, the capacitance between the coil 36 and ground will be increased, which in turn increases the capacitance between the plate 18 and ground. In this manner the resonant frequency of the oscillator circuit may be decreased. Since the change in inductance of the coil 36 caused by the movement of the core 40 is very small in the V.H.F. bands as compared to the total tank circuit inductance, the capacitance changes will predominate and the tuning will depend almost exclusively on them.

It is thus apparent that the tuning element 8, connected in the tank circuit 10 of the oscillator as shown, provides a simple and effective means for fine tuning the receiver over the entire range of operating frequencies. The provision of the single element 8 permits fine tuning over both V.H.F. bands and the U.H.F. bands with the single fine tuning control element 46. In addition, the tuning unit 8 can be manufactured at low cost and is mechanically simple, decreasing the chances for mechanical failures. If desired a physical capacitor plate 41 may be placed adjacent the core 40 and connected to ground. Thus the combination of the plate 41 and the tuning core 40 may comprise the capacitor 39. It has been found, however, that the inherent capacitance existing between the tuning unit and ground, without this provision, is sufficient to permit fine tuning over the desired range of frequencies.

It has also been found that under ordinary operating conditions, the strength of the oscillations at the lower oscillator freqencies is somewhat greater than at the higher frequencies. To obtain uniformity of oscillation amplitude over the range of operating frequencies, the resistor 28 has been added to the plate voltage supply lead. In combination with the radio-frequency choke coil 30, this resistor is effective to decrease the strength of oscillations at the lower frequencies.

The circuit operates in accordance with well known heterodyne principles. Thus an intermediate-frequency is produced by mixing the received signal with the oscillator signal to produce a beat or intermediate frequency signal in the circuit illustrated, assuming that the tuned circuits 50 and 52 of the tuning segment 53 have been adjusted for reception of channel 30 in the U.H.F. bands. This channel has a frequency range of 566 to 572 mc. The received signal after passing through other tuned input circuits of the receiver as mentioned hereinbefore and which may be located on the tuning segment 53, is inductively coupled to the mixer circuit through the inductor 64. At the same time the oscillator is tuned to the correct oscillator frequency by the insertion of the capacitor 58 and the inductor 60 between the plate 18 and the grid 20 of the electron tube 6. For an intermediate frequency of approximately 41 mc. this means that the oscillator frequency will be approximately 613 mc. Oscillator signals at this frequency will be coupled through the inductor 76 to the mixer circuit. The incoming signals and the oscillator signals are then beat together in the signal mixer 14 to produce the intermediate frequency signal. This latter signal may then be coupled to the intermediate frequency stage of the receiving system through the output circuit 16.

If precise tuning is required, the rotation of the fine tuning control knob 46 accomplishes this result. As the knob 46 is rotated, the oscillator tank circuit is subjected to either a change in inductance (U.H.F. reception) or in capacitance (V.H.F. reception). These inductance and capacitance changes are due to movement of the tuning core 40 with respect to the fixed element 36. Since the tuning element 8 is extremely sensitive, very precise tuning is accomplished with little effort and over the entire range of frequencies.

For V.H.F. reception the operation is much the same. As the viewer turns the turret, varying amounts of circuit impedance are switched into the oscillator and mixer circuits, thus changing the operating frequency or channel selection. The appropriate oscillator signals are then either capacitively or inductively coupled to the mixer circuit and beat with the received signal to produce the desired intermediate-frequency signal. Fine tuning may then be accomplished by rotating the control knob 46.

As described herein, an improved local oscillator circuit for a signal receiving system in accordance with the invention, may easily and accurately be tuned over a wide frequency range. With the circuit described, a television receiver may be tuned within the U.H.F. band of frequencies as well as both V.H.F. bands. Furthermore, the oscillator is readily adaptable for use with a turret-type tuner and provides a single fine tuning control means which can be used over the entire frequency range or for all channels, and which is of simple, low-cost construction while being extremely effective.

What is claimed is:

In a television signal receiving system, the combination with tuning means for signal selection in each of a plurality of high frequency bands, of a tunable local oscillator adapted for operation in each of said bands and comprising an electronic tube having an anode, a cathode, and a control electrode; an anode current supply circuit including an inductor and a resistor serially connected in said circuit adjacent to said anode; an oscillator tuning circuit connected between said anode and control electrode and including fine tuning means comprising a relatively wide substantially one-turn inductive coil having opposite ends in close spaced relation, means connecting one end of said coil to said anode, a conductive tuning core mounted to move longitudinally within said coil and providing capacity and inductance changing means for said tuning circuit, fine tuning control means for said system connected with said core to move and control said core; signal mixing means for said system; signal band changing means comprising a rotatable member having tuning elements thereon providing at least a pair of frequency determining tuned circuits in close spaced relation; contact and circuit means associated with said member connecting one of said tuned circuits between said coil and said control electrode and the other of said tuned circuits with said signal mixing means; means providing a relatively small inductive loop in said other tuned circuit in close proximity thereto; means providing a variable tap connection between one end of said loop and a source of fixed potential whereby the inductive coupling between said tank circuit and said loop may be varied, and a resistor connected in parallel with said loop and said tap to control the injection of oscillator energy to said mixer circuit.

References Cited in the file of this patent

UNITED STATES PATENTS

| | | |
|---|---|---|
| 2,516,287 | Aske | July 25, 1950 |
| 2,543,479 | Toman | Feb. 27, 1951 |
| 2,543,891 | Carlson et al. | Mar. 6, 1951 |
| 2,551,228 | Achenbach | May 1, 1951 |
| 2,555,520 | Torre | June 5, 1951 |
| 2,584,120 | Fyler et al. | Feb. 5, 1952 |
| 2,584,176 | Wingert | Feb. 5, 1952 |
| 2,596,117 | Bell et al. | May 13, 1952 |
| 2,611,088 | Harvey | Sept. 16, 1952 |
| 2,698,387 | Schuster | Dec. 28, 1954 |
| 2,705,288 | Wallin | Mar. 29, 1955 |